United States Patent

[11] 3,552,659

| [72] | Inventor | Edward T. Meyer<br>Shaker Heights, Ohio |
|---|---|---|
| [21] | Appl. No. | 761,210 |
| [22] | Filed | Sept. 20, 1968 |
| [45] | Patented | Jan. 5, 1971 |
| [73] | Assignee | Meyer Products, Inc.<br>Cleveland, Ohio<br>a corporation of Ohio |

[54] SPREADER HOPPER FOR DUMP TRUCK
7 Claims, 8 Drawing Figs.

[52] U.S. Cl. .................................................. 239/657,
298/8, 298/27, 214/508
[51] Int. Cl. .................................................. E01c 19/20
[50] Field of Search ............................................. 239/657;
298/7, 8, 24, 27; 214/508

[56] References Cited
UNITED STATES PATENTS

| 1,533,419 | 4/1925 | Hug .............................. | 298/8X |
| 1,820,910 | 9/1931 | Harm ............................ | 298/8 |
| 2,698,184 | 12/1954 | Bowen .......................... | 239/657 |
| 3,158,375 | 11/1964 | Vig ................................ | 239/657 |
| 3,393,875 | 7/1968 | Bryant, Jr. .................... | 239/657X |

Primary Examiner—M. Henson Wood, Jr.
Assistant Examiner—Michael Y. Mar
Attorney—Meyer, Tilberry and Body ABSTRACT: A dump truck bed defines a tiltable container including a partition dividing the container into two compartments. One compartment is substantially smaller than the other and defines a spreader hopper for dispensing particulate material through an outlet when the container is in horizontal position. The spreader hopper is refilled by tilting the container so that material flows past the partition into the spreader hopper.

PATENTED JAN 5 1971

INVENTOR.
EDWARD T. MEYER

BY Meyer, Tilberry & Body

ATTORNEYS

PATENTED JAN 5 1971

INVENTOR.
EDWARD T. MEYER
BY Meyer, Tilberry & Body
ATTORNEYS

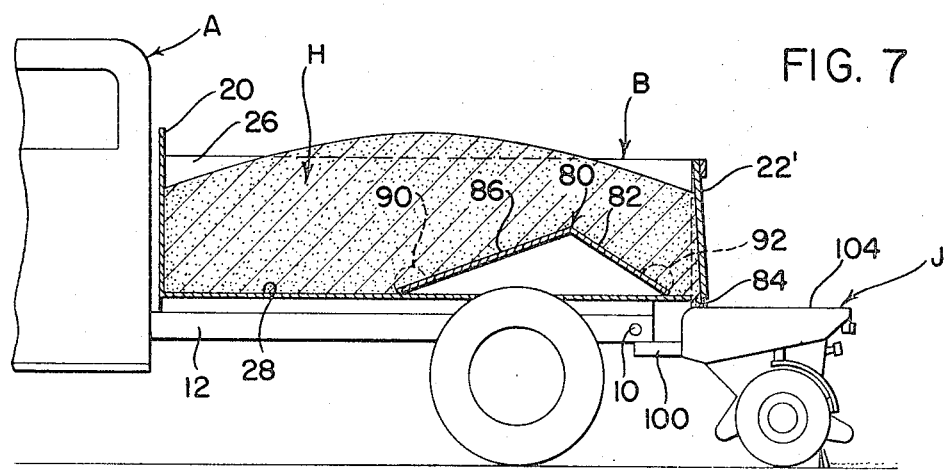
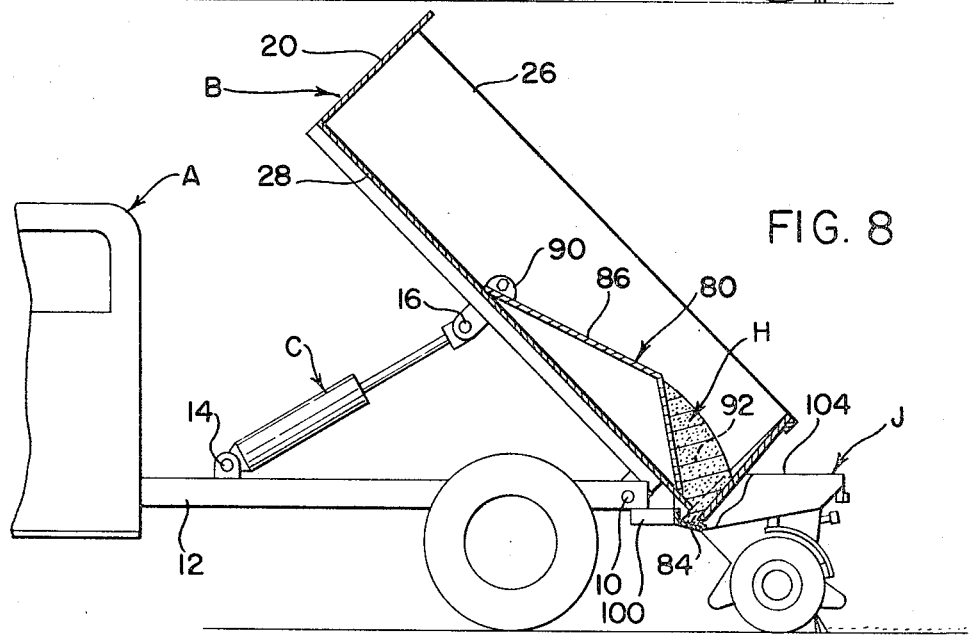

SPREADER HOPPER FOR DUMP TRUCK

BACKGROUND OF THE INVENTION

This application pertains to the art of spreading granular material onto roadways from a dump truck bed and, more particularly, to a dump truck bed defining a container which is tiltable and has a partition forming a spreader hopper for dispensing through an outlet with the container in horizontal position.

The invention is particularly applicable to a tiltable dump truck bed and will be described with particular reference thereto, although it will be appreciated that the invention has broader applications, and may be used for any container which normally dispenses by tilting.

Dump trucks are commonly used for distributing granular or pulverulent material, such as salt, calcium chloride or sand, onto icy road surfaces. This is done by attaching a spreader to the rear end of the truck bed adjacent the outlet opening in the tailgate of the bed. The truck is driven down a roadway with the bed being tilted to various positions in order to keep the material flowing through the outlet to the spreader. Driving with the bed tilted shifts the center of gravity of the truck and impairs visibility, which is very hazardous. Driving with the bed tilted and loaded also produces unnecessary stresses on parts of the truck and bed. It would be desirable to have an arrangement whereby material could be dispensed and spread with the truck bed in horizontal position.

Previous arrangements for dispensing with the truck bed in horizontal position have included nontiltable beds with a bottom wall which sloped sharply upward and away from the bed outlet. This arrangement requires extremely high sidewalls to obtain the same volume capacity as a flat bottom dump bed. It also wastes a considerable volume of space on the entire truck. Other arrangements for dispensing from a flat bottom dump bed without tilting included having a person standing in the bed and manually shoveling material to the outlet. This is not only very inefficient, but also very hazardous on a moving vehicle. Mechanical devices for moving the material toward the outlet from the entire bed require extensive time for installation and removal so that it is difficult to convert the truck to conventional use.

SUMMARY

In accordance with the present invention, a dump truck bed is provided with a partition forming two compartments. One compartment is substantially smaller than the other and is located adjacent an outlet from the bed. The smaller compartment defines a spreader hopper for dispensing when the bed is in horizontal position. The spreader hopper may be refilled by tilting the bed to cause material to flow past the partition into the spreader hopper. A complete load of material may be dispensed from the bed with the bed in horizontal position and tilting is required only periodically to refill the spreader hopper. The partition preferably slopes upwardly and away from the outlet opening. The partition may be pivotally and detachably connected at its upper end edges to the sidewalls of the truck bed. In addition, the partition may be semipermanently secured inside of the truck bed and may include wall portions sloping upwardly and away from each compartment.

It is a principal object of this invention to provide a tiltable container with a spreader hopper for dispensing with the container in a horizontal position.

It is another object of this invention to provide such a container wherein the partition is pivotally and detachably connected at its top end edges to sidewalls of the container.

It is a further object of this invention to provide such a container wherein the partition slopes upwardly and away from an outlet opening.

It is another object of this invention to provide such a container wherein material may flow past the partition to refill the spreader hopper when the container is tilted.

It is another object of this invention to provide a device for converting a conventional dump truck bed into a spreader hopper and recharging compartment for the spreader hopper.

BRIEF DESCRIPTION OF THE DRAWINGS

FIG. 7 is a side cross-sectional elevational view of a modified form of the present invention; and, FIG. 8 is a side cross-sectional elevational view thereof with the truck bed in tilted position.

DESCRIPTION OF THE PREFERRED EMBODIMENT

The invention may take physical form in certain parts and arrangement of parts, a preferred embodiment of which will be described in detail in this specification and illustrated in the accompanying drawings.

Figure 1:
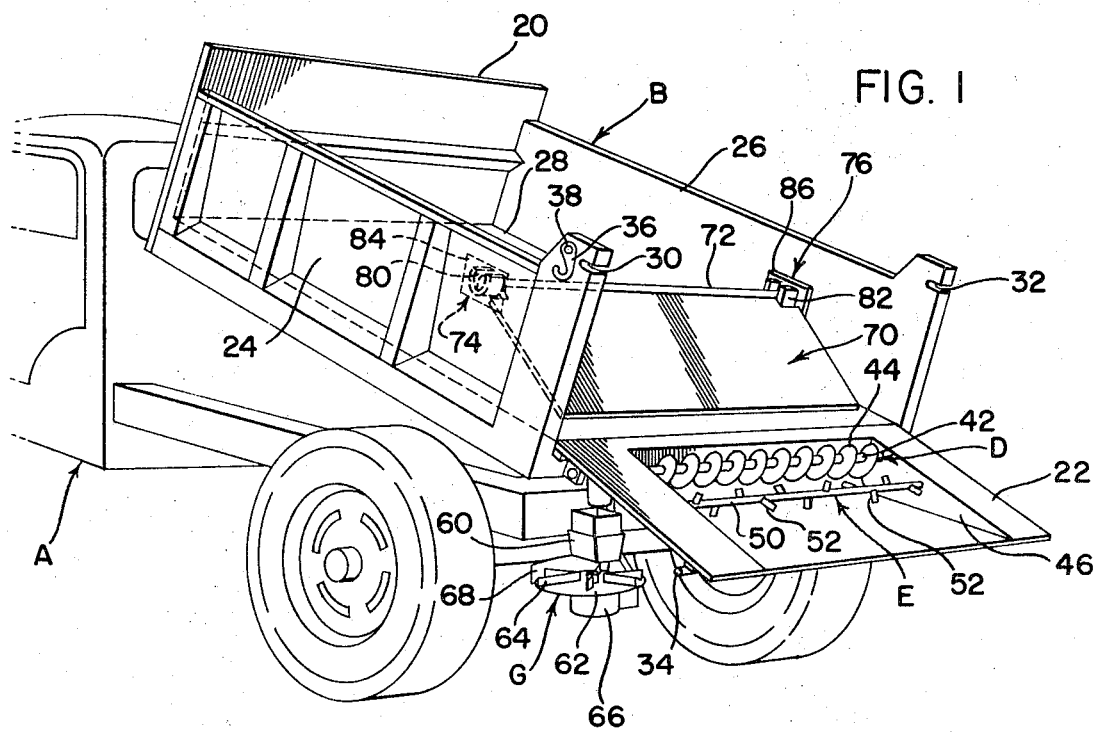
FIG. 1 is a perspective view of a dump truck bed having the present invention embodied therein.

FIG. 1 shows a dump truck A having a bed B pivotally mounted thereon as at 10 so as to be tiltable in a well known manner. Truck A includes a telescoping hydraulic cylinder C pivotally attached to frame 12 of truck A as at 14 and to bed B as at 16 in a well-known manner. Bed B defines a generally rectangular container having front end wall 20, rear end wall 22, sidewalls 24 and 26, and horizontal bottom wall 28. Rear end wall 22 may be pivotally connected with bed B along its top or bottom edge and is so connected along its bottom edge in the arrangement shown in a well-known manner. The rear edges of sidewalls 24 and 26 may include notches as at 30 and 32 which receive projections at the upper outer edges of rear wall 22 and only one of which is shown at 34. Latches on sidewalls 24 and 26 may be provided to hook over projection 34 to hold it in notch 30, and only one such hook is shown at 36 pivoted on pin 38.

Rear end wall 22 may be recessed as shown in FIG. 1 and have a feed auger D rotatably mounted therein. Auger D includes a central shaft 42 and a spiral blade 44 welded to shaft 42. The ends of shaft 42 are rotatably journaled in side ends of the recess in rear wall 22 and only one such side end is shown at 46 in FIG. 1. Shaft 42 is rotatably driven by a suitable motor which is not shown. When shaft 42 is rotated blade 48 also rotates to feed material axially of shaft 42 toward one end of auger D.

The recess rear wall 22 may also contain an agitator E having a control shaft 50 and knife blades 52 welded to shaft 50. Shaft 50 has its ends rotatably journaled in the side ends such as 46 of the recess in rear wall 22. Shaft 50 is rotatably driven by a motor which is not shown. Agitator E is spaced vertically above auger D when rear wall 22 is in position closing container B so that granular material in container B is loosened as it falls toward auger D.

Rear end wall 22 has an outlet opening 54 at the left end thereof and auger D feeds material to its left toward outlet 54. It will be understood that outlet opening 54 may be placed in many other locations and take many other forms. The outlet should be adjacent the intersection of bottom wall 28 and rear wall 22.

Mounted at the bottom rear end of container B is a spreader G which may be freely pivoted on a horizontal axis parallel to rear wall 22 as is well known in the art. Spreader G includes an adjustable chute 60 which has an open top positioned to receive material from outlet 54, and an open bottom through which material is directed onto a rotatable spreader disc 62 including vanes 64 and being rotatably driven about a vertical axis by motor 66. Chute 60 may be adjusted so that its open bottom directs material to the center or different areas of disc 62 for varying the area over which material is spread. Material falling onto disc 62 is acted upon by rotating disc 62 and vanes 64, and is thrown horizontally outward. The area of spread depends upon the rotational speed of disc 62 and the position of the open bottom of chute 60. A vertical guard 68 may be attached to the frame of spreader G between disc 62 and truck A so that material is spread only laterally and rearwardly at the rear of bed B.

A flat rectangular plate member 70 defines a partition in container B, and partition 70 may have a rod 72 welded or otherwise secured to its top edge. The ends of rod 72 are received in U-shaped socket members 74 and 76 so that partition 70 is pivotally and detachably mounted in container B. U-shaped socket members 74 and 76 have flat strips 80 and 82 bent into a U-shape and with one of their side edges welded to plates 84 and 86. Plates 84 and 86 may be bolted to sidewalls 24 and 26 with the open end of U-shaped strips 80 and 82 facing upward.

Partition 70 divides container B into two compartments. The rear compartment defines a spreader hopper for dispensing material through outlet 54 to spreader G. The front compartment defines a recharging hopper for the spreader hopper. The bottom edge of partition 70 intersects bottom wall 28 closely adjacent the rear end of bed B, and also slopes upwardly and away from outlet 54 at an angle substantially greater than the angle of repose of material to be dispensed so that substantially all of the material in the spreader hopper will be dispensed through outlet 54 when bottom wall 28 of bed B is in a horizontal position. The top edge of partition 70 is spaced substantially below the upper edges of sidewalls 24 and 26, and the volume of the spreader hopper is substantially less than that of the recharging hopper. Such spacing and difference in volume will vary substantially depending upon the depth and length of container B. As an example, the top edge of partition 70 may be spaced one-fourth of the height of sidewalls 24 and 26 down from the upper edges thereof. The volume of the spreader hopper may be one-tenth that of the total volume of container B. Such examples are given merely for purposes of showing what the spacing and volume could be, and the actual spacing and volume will vary substantially above and below the example figures depending upon such factors as the depth and length of container B.

Figure 2:
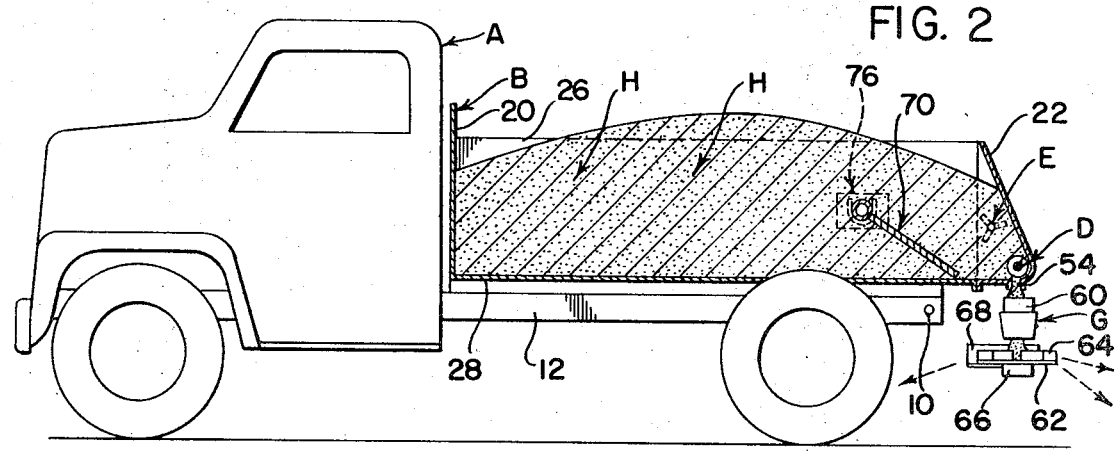
FIG. 2 is a side cross-sectional elevational view thereof with the dispensing hopper filled.
Figure 3:
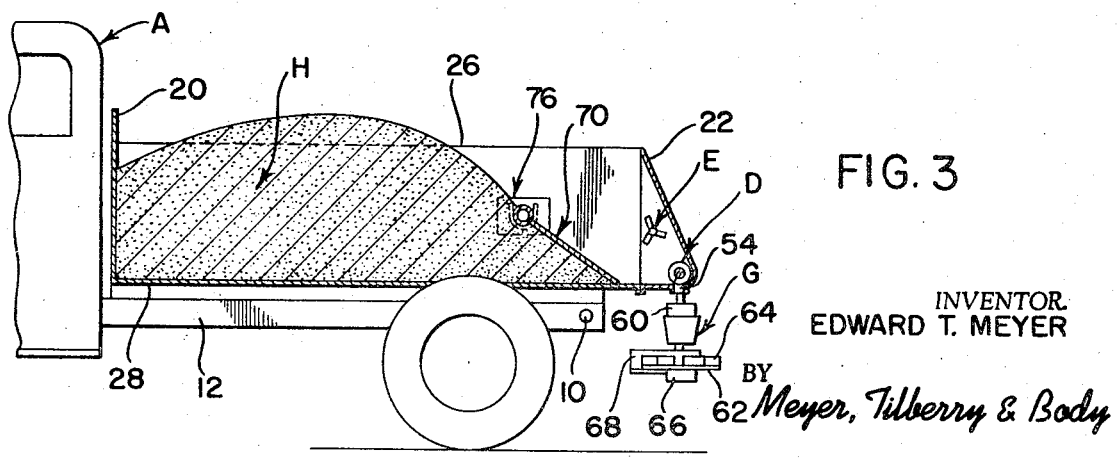
FIG. 3 is a side cross-sectional elevational view thereof with the dispensing hopper emptied.
Figure 4:
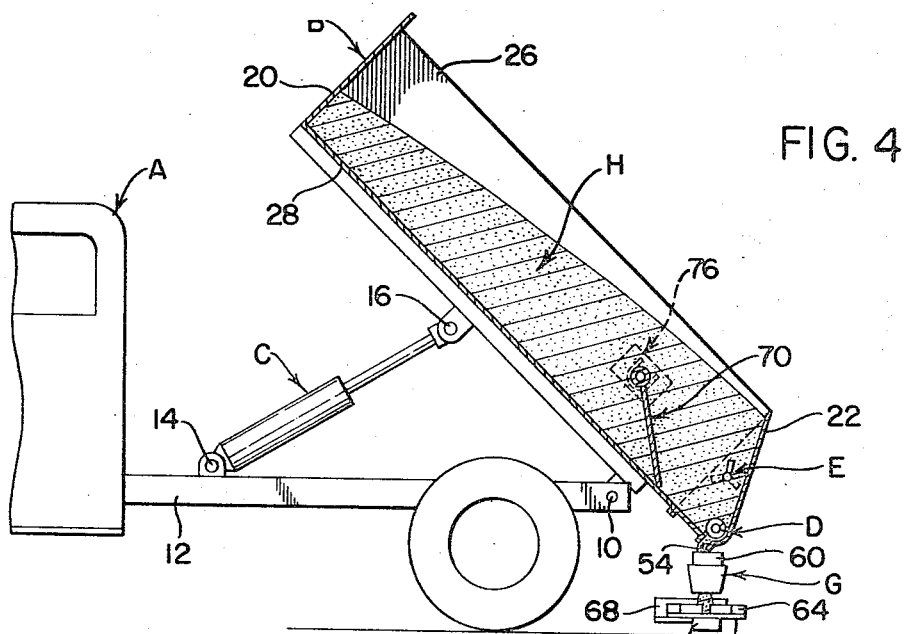
FIG. 4 is a side cross-sectional elevational view with the truck bed tilted to refill the dispensing hopper.
Figure 5:
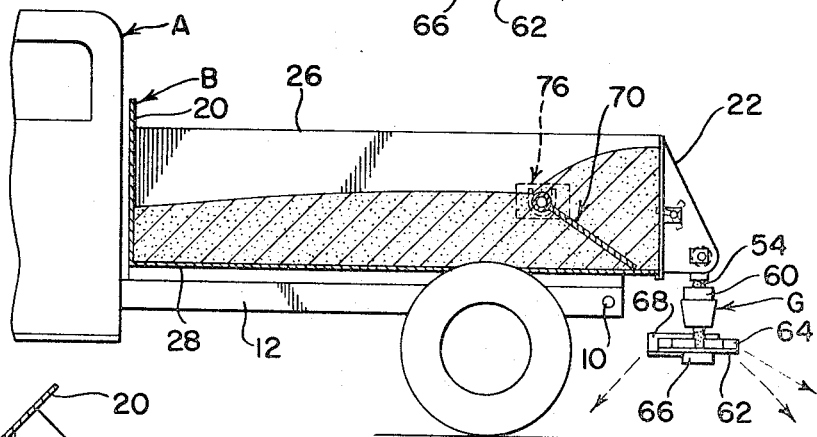
FIG. 5 is a side cross-sectional elevational view thereof with the dispensing hopper refilled.
Figure 6:
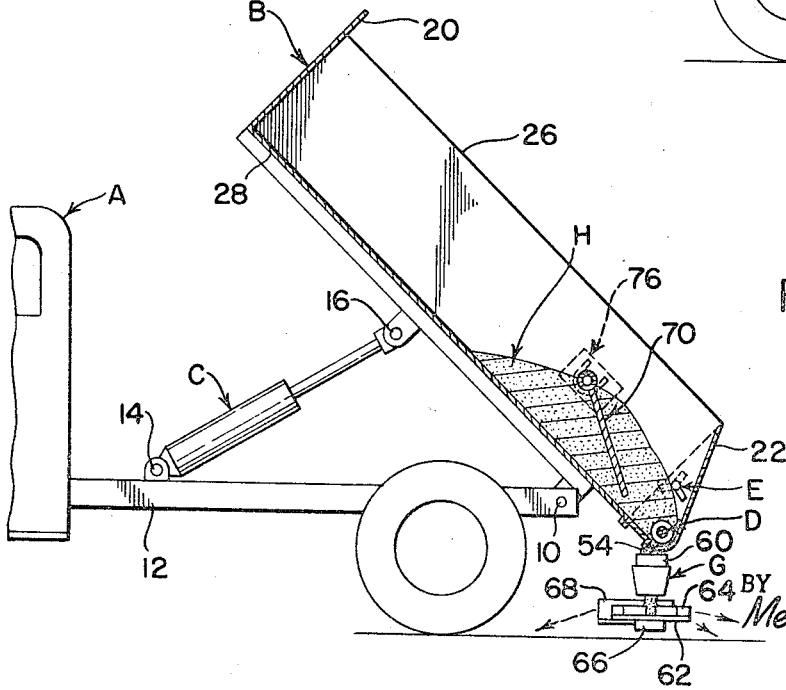
FIG. 6 is a side cross-sectional elevational view thereof with very little material left in the container.

FIG. 2 shows container B after it has been filled with granular material H such as rock salt, calcium chloride, sand or the like, by a front end loader, or the like. Material H will be fed from the spreader hopper compartment through outlet opening 54 until the hopper is empty and a condition, such as shown in FIG. 3, exists. The top edge of partition 70 is spaced substantially downward from the top edge of sidewalls 24 and 26. With this arrangement material H will flow over the top edge of partition 70 from the recharging hopper to refill the spreader hopper compartment when container B is tilted, as shown in FIG. 4. Once the spreader hopper compartment is filled, container B may be returned to a horizontal position, as shown in FIG. 5, and material once again fed from the spreader hopper to spreader G. This procedure is repeated until substantially all of material H is dispensed from container B.

Partition 70 would normally be of heavy material, such as steel or cast iron. Granular material H will usually have a low angle of repose, such as around 25°, so that it flows over the top edge of partition 70 before sufficient force is exerted against the bottom side of partition 70 to pivot it up out of contact with bottom wall 28. When substantially all of granular material H is dispensed from container B it will be necessary to tilt container B to its maximum raised position. Substantially all of the weight of the remaining granular material then exerts sufficient force on partition 70 to pivot it up slightly, out of contact with bottom wall 28 so that material H flows beneath partition 70. It will be understood that all of granular material H can be removed in other ways. For example, partition 70 can have short legs on its bottom edge holding it spaced slightly above bottom wall 28. In addition, partition 10 may be secured to sidewalls 24 and 26 in a nonpivoted condition and spaced slightly above bottom wall 28. Likewise, partition 70 may have such a length and have such an angle from its pivot points to bottom wall 28 that it hangs in a substantially vertical position with its bottom edge swung out slightly when container B is tilted to its maximum inclination. In this manner the last of material H in container B will flow under partition 70 while the weight of partition 70 and tilting of container B at less than its maximum inclination during normal refilling of the spreader hopper will leave the bottom edge of partition 70 adjacent bottom wall 28.

FIG. 7 shows another form of partition 80, including a wall portion 82 sloping upwardly and away from an outlet opening 84 at the rear end of container B. Another wall portion 86 slopes upwardly and away from the recharging hopper compartment which feeds the spreader hopper compartment. Partition 80 may have ears as at 90 and 92 which may be bolted to sidewalls 24 and 26 of container B. Wall portions 82 and 86 intersect along a line spaced substantially below the top edges of sidewalls 24 and 26 of container B so that material may flow over partition 80 into the spreader hopper compartment. In this embodiment rear wall 22' may be pivotally attached to container B along its top edge so that its bottom edge swings outward to define outlet 84. The pivotal extent of rear wall 22' may be limited by adjustable chains and hooks (not shown) in a well known manner. The operation of this embodiment as far as dispensing and then refilling is the same as previously described with regard to FIGS. 2 through 5.

FIGS. 7 and 8 also show a wheeled type spreader J which is towed by truck A. Wheeled spreader J may have suitable connecting brackets 100 for attachment to the rear of frame 12. Wheeled-type spreader J usually has a width the same as the width of bed B and has an elongated outlet of substantially the same width. Wheeled spreader J includes a loading hopper 104 which is open at its bottom through the elongated outlet. Loading hopper 104 may have an agitator within it as described for agitator E in FIG. 1 and a distributing spiral roller (not shown) for dispensing material at an equal rate throughout the length of the elongated opening. Such distributing spiral roller and agitator may be rotated by suitable gearing connected with the ground engaging wheels of wheeled spreader J. In previous arrangements where wheel spreaders such as J were used, it was necessary to tilt container B to refill loading hopper 104. There was no way of accurately filling loading hopper 104 and material was often wasted by dispensing too much. With the present invention the maximum volume of the dispensing hopper compartment formed by partition 70 or 80 may be the same or slightly less than the maximum volume of loading hopper 104. In this manner, loading hopper 104 can be accurately filled without wasting material.

With the present invention it is possible to determine the amount of time it normally takes to empty the spreader hopper compartment. The operator of truck A can then stop to tilt container B and refill the spreader hopper compartment at certain timed intervals without having to check whether the spreader hopper needs refilling.

While the invention has been described with reference to the preferred embodiment obvious modifications and alterations will occur to others upon the reading and understanding of the specification.

I claim:

1. In a dump truck including a bed and means for tilting said bed, said bed defining a container having a substantially horizontal bottom wall, a front end wall, a rear end wall and sidewalls, and an outlet opening adjacent the intersection of said bottom wall and said rear end wall, said container being tiltable to place said bottom wall in an inclined position with said outlet opening at substantially the lowest elevation point on said container, the improvement comprising: partition means for forming a spreader hopper compartment in said container to dispense through said outlet with said bottom wall in a substantially horizontal position, said partition means having a generally rectangular outline including top and bottom edges and side edges and being dimensioned to extend across said container from sidewall to sidewall thereof with said top and bottom edges substantially parallel to said front and rear end walls with said bottom edge adjacent said bottom wall and spaced closely adjacent said outlet opening, and with said top edge spaced substantially below the upper edges of said sidewalls and rearwardly and above said bottom edge so that said partition slopes upwardly from said bottom wall in a direction away from said outlet opening, said partition means when so positioned defining a spreader hopper on one side thereof with said outlet opening leading from said spreader hopper and defining a recharging hopper on the other side thereof with said recharging hopper being of substantially greater volume than said spreader hopper, and material in said container being gravitationally displaceable over said top edge of said partition means from said recharging hopper to said spreader hopper when said container is tilted.

2. The device of claim 1 wherein said partition means includes fastening means on said side edges for detachably securing said partition means in said container.

3. The device of claim 1 wherein said partition means includes another generally rectangular portion sloping downwardly and away from said top edge, said other portion having another bottom edge positionable adjacent said bottom wall and other side edges positionable adjacent said sidewalls.

4. The device of claim 1 wherein said partition means includes attaching means adjacent the intersection of said top edge and side edges for pivotally and detachably mounting said partition means to said sidewalls in said container.

5. In a dump truck including a bed and means for tilting said bed, said bed defining a container having a substantially horizontal bottom wall, a front end wall, a rear end wall and sidewalls, and an outlet opening adjacent the intersection of said bottom wall and said rear end wall, said container being tiltable to place said bottom wall in an inclined position with said outlet opening at substantially the lowest elevation point on said container, the improvement comprising: partition means extending across said container from sidewall to sidewall thereof to define first and second compartments in said container, said first compartment having said outlet opening leading therefrom, said second compartment being substantially larger than said first compartment and defining a recharging hopper compartment for said first compartment, said container being tiltable to gravitationally displace material from said second compartment past said partition means to said first compartment, said first compartment defining a spreader hopper for dispensing material from said container through said outlet with said bottom wall in substantially horizontal position, said partition having a bottom edge, said bottom edge being adjacent said bottom wall and spaced closely adjacent said outlet opening, said partition sloping upwardly from said bottom edge in a direction away from said outlet opening, said partition being detachably mounted in said container and the top edge thereof being spaced substantially below the upper edges of said sidewalls.

6. In a dump truck including a bed and means for tilting said bed, said bed defining a container having a substantially horizontal bottom wall, a front end wall, a rear end wall and sidewalls, and an outlet opening adjacent the intersection of said bottom wall and said rear end wall, said container being tiltable to place said bottom wall in an inclined position with said outlet opening at substantially the lowest elevation point on said container, the improvement comprising: partition means extending across said container from sidewall to sidewall thereof to define first and second compartments in said container, said first compartment having said outlet opening leading therefrom, said second compartment being substantially larger than said first compartment and defining a recharging hopper compartment for said first compartment, said container being tiltable to gravitationally displace material from said second compartment past said partition means to said first compartment, said first compartment defining a spreader hopper for dispensing material from said container through said outlet with said bottom wall in substantially horizontal position, said partition having a bottom edge, said bottom edge being adjacent said bottom wall and spaced closely adjacent said outlet opening, said partition sloping upwardly from said bottom edge in a direction away from said outlet opening, said partition being pivotally attached to said sidewalls at substantially the top side edges of said partition means at points spaced substantially below the upper edges of said sidewalls.

7. In a dump truck including a bed and means for tilting said bed, said bed defining a container having a substantially horizontal bottom wall, a front end wall, a rear end wall and sidewalls, and an outlet opening adjacent the intersection of said bottom wall and said rear end wall, said container being tiltable to place said bottom wall in an inclined position with said outlet opening at substantially the lowest elevation point on said container, the improvement comprising: partition means extending across said container from sidewall to sidewall thereof to define first and second compartments in said container, said first compartment having said outlet opening leading therefrom, said second compartment being substantially larger than said first compartment and defining a recharging hopper compartment for said first compartment, said container being tiltable to gravitationally displace material from said second compartment past said partition means to said first compartment, said first compartment defining a spreader hopper for dispensing material from said container through said outlet with said bottom wall in substantially horizontal position, said partition having a bottom edge, said bottom edge being adjacent said bottom wall and spaced closely adjacent said outlet opening, said partition sloping upwardly from said bottom edge in a direction away from said outlet opening to define a first partition portion and further including a second partition portion sloping upwardly from said bottom wall in a direction away from said recharging hopper compartment toward said spreader hopper compartment, said first and second partition portions intersecting along a line spaced substantially below the upper edges of said sidewalls.